United States Patent [19]
Fabbiani

[11] Patent Number: 4,802,758
[45] Date of Patent: Feb. 7, 1989

[54] DEVICE FOR QUALITY CONTROL OF HOLOGRAMS

[76] Inventor: Bruno Fabbiani, Via Feletto, 17, 10155 Torino, Italy

[21] Appl. No.: 43,639

[22] Filed: Apr. 28, 1987

[30] Foreign Application Priority Data

Apr. 30, 1986 [IT] Italy ................. 67358 A/86

[51] Int. Cl.$^4$ ............................................... G03H 1/02
[52] U.S. Cl. ..................... 356/71; 356/237; 350/3.6
[58] Field of Search ................. 356/237, 347, 400, 71; 350/3.61, 3.6, 3.75, 3.85; 382/2; 235/457; 340/825.34

[56] References Cited

U.S. PATENT DOCUMENTS

| | | | |
|---|---|---|---|
| 3,619,025 | 11/1971 | Hannan | 350/3.61 |
| 3,643,216 | 2/1972 | Greenaway et al. | 350/3.61 |
| 4,030,830 | 6/1977 | Holly | 356/237 |
| 4,264,192 | 4/1981 | Robb | 356/400 |
| 4,288,164 | 9/1981 | Toth | 356/237 |

Primary Examiner—Vincent P. McGraw
Assistant Examiner—S. A. Turner
Attorney, Agent, or Firm—Kane, Dalsimer, Sullivan, Kurucz, Levy, Eisele and Richard

[57] ABSTRACT

The device consists essentially of a frame designed to support the hologram, at least one source of electromagnetic radiation, at least one sensor and a processing unit which, in at least one predetermined relative position assumed by the aforesaid frame, source and sensor, verifies that the electrical signals emitted by the sensor and dependent upon the radiation associated with a portion of the reconstructed image of the hologram correspond to electrical signals previously stored in the memory of the processing unit.

22 Claims, 7 Drawing Sheets

DEVICE FOR QUALITY CONTROL OF HOLOGRAMS

BACKGROUND OF THE INVENTION

The present invention relates to a device for quality control of the various types of holograms and three-dimensional images reconstructed directly from the stereoscope. Quality control of the holographic images known as "embossed," visible in white light by reflection, transferred thermally and by other techniques onto flat media such as paper, plastic cards, metal sheets, etc., is currently done with the naked eye because of the current lack of devices capable of qualitatively evaluating the uniformity of the transfer and the effect of the superficial characteristics of the medium (affecting the definition and chromatic distribution of the stereoscopic image). It is state of the art to provide documents for purposes of identification (passports, for example) or access to given areas or security or access to so-called "cash dispensers" with holograms (where the hologram has the sole function of conferring value upon the document), the authenticity of which is eventually verified solely by the naked eye, since, as we said before, there are no devices suitable for the purpose. It has also been observed that the need is growing to have a device capable of determining the different pallax values of the stereoscopic images reconstituted from a flat surface (transferred by photographic, graphic, holographic or holographic-television techniques and the like) in order to be able to make comparisons of a qualitative nature on the basis of objective values. For that purpose, one must first determine the parallactic variations produced by said images on axes x and y, while the depth with reference to axis z must be determined with respect to the plane on which the perceivable image is registered, whether by transmission, projection or reflection.

The automated graphic representation showing the stereoscopic extension of the examined image with the corresponding data synthesized on a map thus becomes fundamental. The map makes it posssible, in fact, to identify the progression of the various parameters, particularly for holographic objects with either conventional or differentiated typology, of the images reconstructed from the individual hologram, images that may be virtual, real, transitional, of multiple objects, etc.

SUMMARY OF THE INVENTION

The aim of this invention is to create a device suitable for performing quality control checks on holograms and capable of meeting current needs as described above with respect to both the possible applications in the area of combatting forgery of various documents (identification papers, banking papers, military papers, etc.) and applications in the related area of stereogoniometric analysis of holograms.

The aforesaid aim is achieved by the present invention in that it relates to a device for quality control of a hologram, characterized by comprising:
  means of support for said hologram;
  means for emitting electromagnetic radiation incident on said hologram; and
  means for detecting the electromagnetic radiation corresponding to one or more images reconstructed(by trans parency and reflection)during use from said hologram.

BRIEF DESCRIPTION OF THE DRAWINGS

To make this invention easier to understand, several preferred embodiments are described below by way of illustration only and not of limitation with reference to the appended drawings, in which:

FIGS. 7A, 7B, 7C, 8, 9 and 10 relate to alternative embodiments of some details of the device shown in FIG. 1.

DETAILED DESCRIPTION OF THE INVENTION

Figure 1:
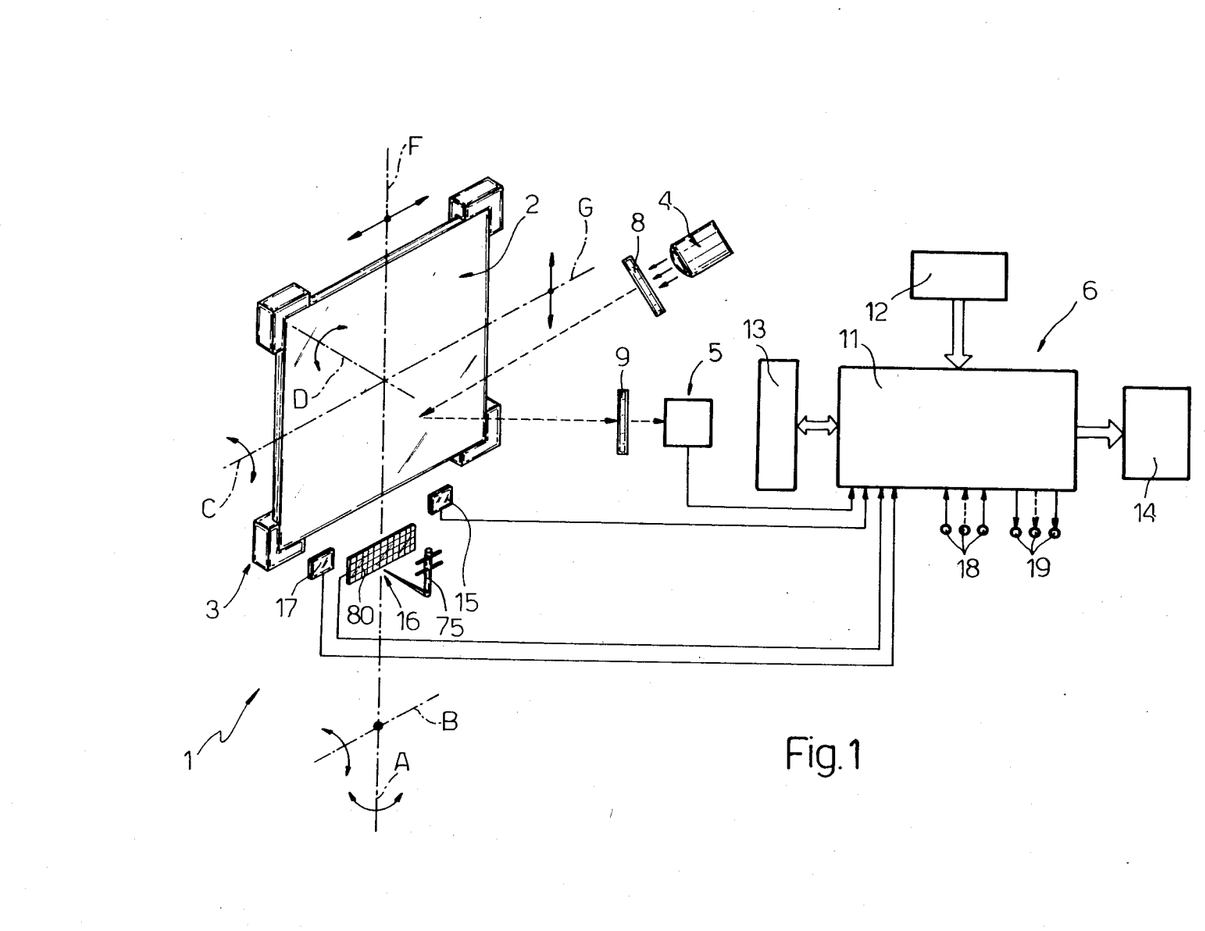
FIG. 1 is a schematic representation of one embodiment of the device pursuant to this invention.

With particular reference to FIG. 1, the number 1 indicates the device as a whole for quality control of a hologram 2.

Pursuant to this invention, the device 1 comprises essentially:
  means of support 3 for the hologram 2;
  means 4 for emitting electromagnetic radiation incident on the hologram 2;
  means 5 for detecting the electromagnetic radiation associated with one or more images reconstructed, during use, from the hologram 2; and
  means 6 of processing signals emitted by the detecting means 5 in at least one predetermined relative position assumed, during use, by the means of support 3 for the hologram 2, the radiation emitting means 4 and the detecting means 5.

The support means 3, which in the example are presented schematically in the form of a frame rectangular in shape surrounding the hologram 2, are mounted so that they are capable of turning around the axes labelled A, B, C and D, respectively, or may move on a plane parallel to that bearing the hologram 2 and in a perpendicular direction to two axes labelled F and G, respectively.

The emitting means 4 may consist of one or more sources of electromagnetic radiation, which may be inside or outside the range of the visible. The same holds for the detecting means 5, which must, of course, have characteristics compatible with those of the emitting means 4. Between the emitting means 4 and the hologram 2, and between the latter and the detecting means 5, are interposed corresponding means 8, 9 for intercepting the electromagnetic radiation. Said intercepting means 8, 9 may be of varying kinds; they may, for example, consist of filters of any kind, single lenses, objectives, masks, diaphragms, etc. They may also be mounted so that they may be replaced or selected according to the particular requirements of code and/or function.

Similarly, the relative positions of the emitting means 4 and the detecting means 5 with respect to the support means 3 of the hologram 2 may be adjusted with respect to all possible degrees of freedom. As you will see below, some of the possible practical alternatives for mounting and moving the means of support 3 of the hologram 2 and the emitting means 4 and detecting means 5 are illustrated.

The processing means 6 comprise essentially a processing unit 11, an input unit 12 (a keyboard, for example), a memory unit 13 and an output unit 14. The processing unit 11 is connected with the output of the detecting means 5 and with the output of three different sensors 15, 16 and 17, respectively, located in proximity to the means of support 3 for the hologram 2 and essentially consisting of a lux meter, a device to measure the angle of incidence of the electromagnetic radiation and a spectrometer. While the lux meter and the spectrometer are essentially prior art, the characteristics of the device 16 for measuring the angle of incidence of the electromagnetic radiation are illustrated in detail with reference to FIG. 3.

The processing unit 11 also has a number of input points connected with respective terminals 18 and a number of output points connected with respective terminals 19, which are connected, in a manner not shown, with corresponding position detectors and electric motors (see FIG. 2) forming part of the support means 3.

Figure 2:
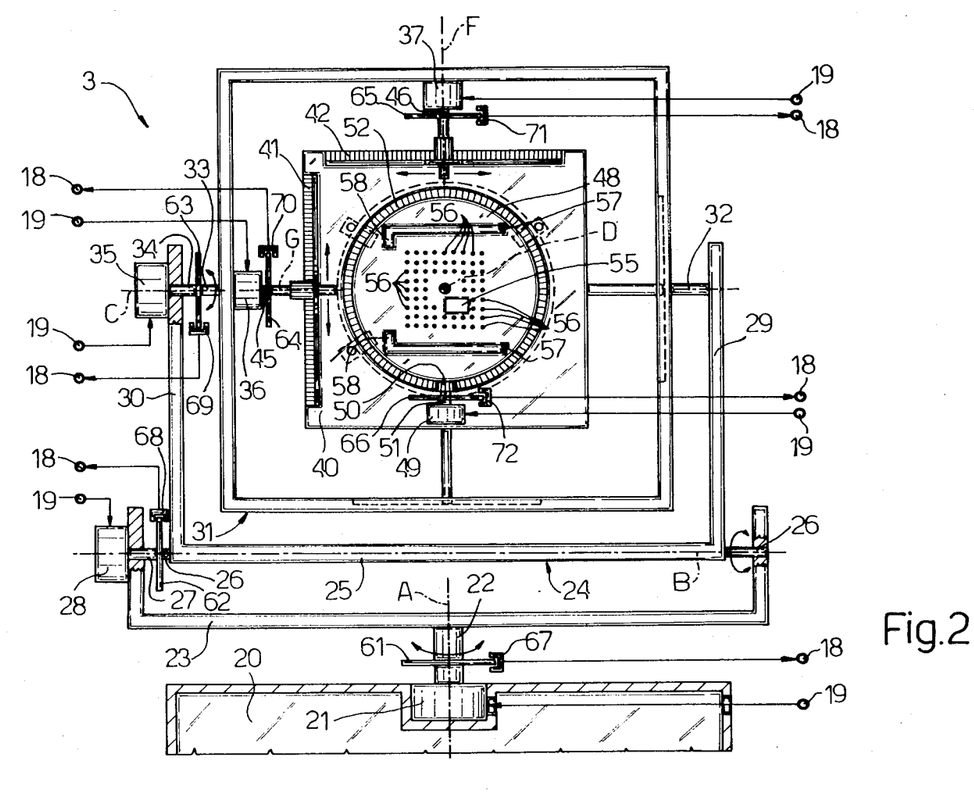
FIGS. 2, 3, 4 and 5 relate to some preferred embodiments of details of the device shown in FIG. 1.

With particular reference to FIG. 2, we will now describe one preferred embodiment of the support means 3, which are designed so that the aforementioned hologram 2 can be shifted with respect to all possible degrees of freedom. In particular, the means of support 3 comprise essentially a base 20 in which is incorporated an electric motor 21 with a shaft 22 that supports a structure 23 essentially in the shape of a U. Between the opposite arms of the structure 23 is interposed another structure 24 in the shape of a U with a central arm 25 supported by opposite pins 26, one of which is attached to one arm of structure 23, while the other is coupled at an angle with the shaft 27 of an electric motor 28 supported by the corresponding arm of structure 23.

Structure 24 supports, on the end portions of the respective facing arms 29, 30, a frame 31 that is essentially square, which is connected to said arms 29, 30 respectively by means of a pin 32 and a pin 33 that is coupled at an angle with a corresponding shaft 34 of an electric motor 35 supported by arm 30.

The frame 31 supports, via a pair of electric motors 36, 37 positioned on perpendicular sides and via the respective shafts of the said motors, a table 40, also essentially square. Specifically, the table 40 has two adjacent sides equipped with respective racks 41, 42 that engage with respective pinions 43, 44 mounted on one end of a corresponding (illegible) shaft 45, 46 of the above-mentioned motor 36, 37.

Inside the table 40 fits a plate 48 capable of rotating about its axis by means of the action exerted by an electric motor 49 mounted on the table 40 and acting via a pinion 50 mounted on the end of a motor shaft 51 on an annular rack 52 on the plate 48. The latter has an aperture 55 that is surrounded by a number of holes 56 distributed in such a way that they do not interfere with the integrity of the data that may be stored on the holographic medium and constituting altogether a suction plane capable of holding the hologram 2 securely in position during use. Outside the holes 56, the plate 48 has a pair of guides 57 that allow the hologram 2 to be placed in the correct position during use, namely, in contact with two adjustable reference points 58. It should be noted, finally, that on the shaft of each of the motors 21, 28, 35, 36, 37 and 49 is keyed a corresponding code disc 61, 62, 63, 64, 65 and 66, each of which acts in conjunction with a corresponding sensor 67, 68, 69, 70, 71 and 72. As already mentioned with reference to FIG. 1, the electric motors are connected with the terminals 19 of the unit 11, while the sensors associated with the respective code discs are connected with the terminals 18 of the said unit 11.

Figure 3:
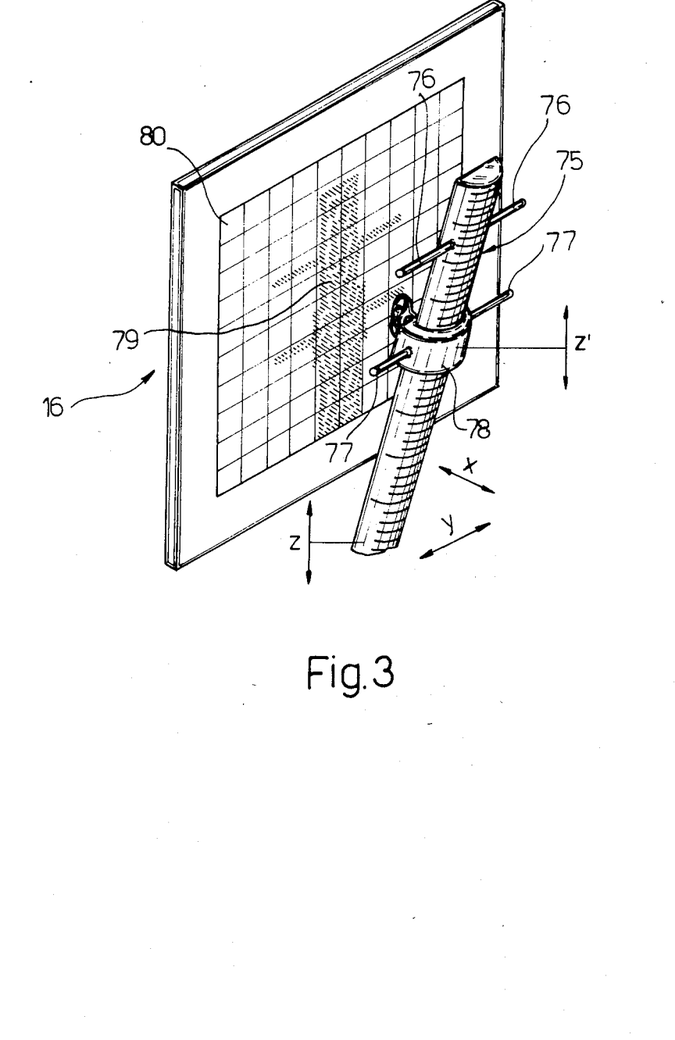

With reference to FIG. 3, the latter depicts in detail the said device 16 for measuring the angle of incidence of the electromagnetic radiation. Said measuring device 16 is essentially composed of a vertical rod 75 (gnomon), which is capable of movement with respect to three axes perpendicular to one another labelled x, y and z, respectively. The rod 75 bears on its upper end a pair of cross bars 76 and at an intermediate point another pair of cross bars 77 supported by a sleeve 78 that slides up and down the rod 75 and hence in a direction that coincides with axis z and is thus labelled z'. During use, the rod 75 with its associated cross bars casts its shadow, labelled 79, on a surface suitably consisting of a matrix 80 of elements sensitive to one or more kinds of radiation. What happens is that the shadow 79 obscures some of said elements, while the rest are exposed to the said electromagnetic radiation.

Figure 4:
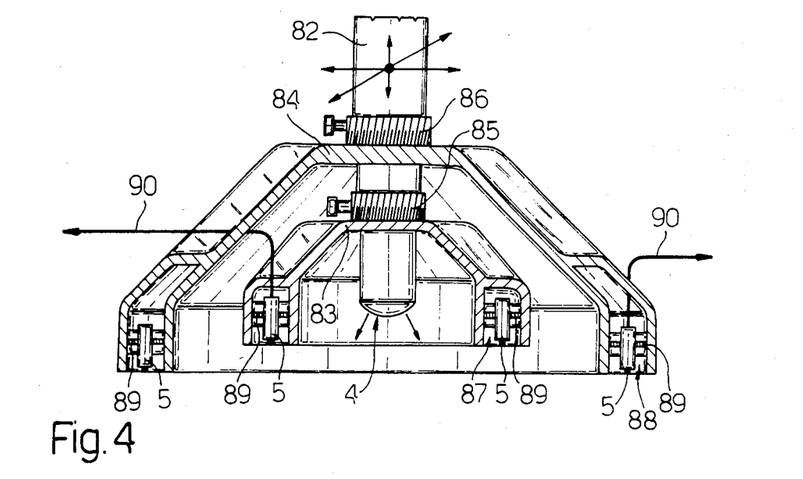
Figure 5:
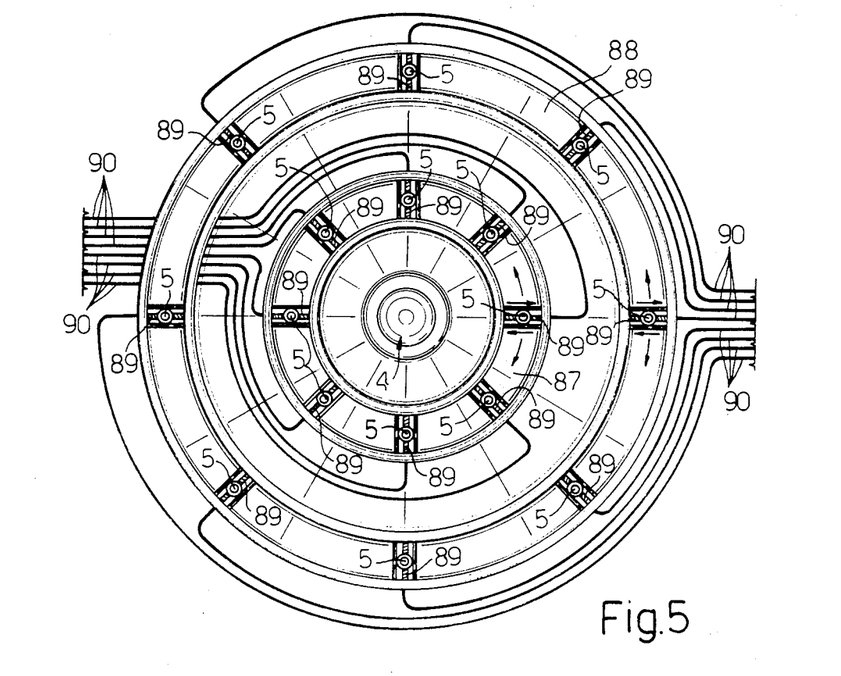

With particular reference to FIGS. 4 and 5, a special support structure is shown for the means 4 of emitting electromagnetic radiation and the means 5 of detecting the radiation reconstituted during use from the hologram 2. It should be noted in particular (see FIG. 4) that the emitting means 4 are mounted on the end of a threaded bar 82, which can be moved, in a manner not shown, with respect to three axes perpendicular to one another and labelled x, y and z, respectively. The detecting means 5 are supported by two cup-like structures labelled 83 and 84, respectively, that are screwed onto the bar 82 and secured on the latter by means of respective collars 85, 86. In further detail, each cup-like structure 83, 84 has on its own rim an annular seat 87, 88 on the inside of which are fitted a certain number of said detecting means 5. Each of the said detecting means 5 is attached to the delimiting walls of the respective annular seat 87 by appropriate means 89 of adjusting the relative position of the respective detecting means 5, both radially with respect to the emitter 4 and circumferentially.

Finally, each of the detecting means 5 is connected with a corresponding cable designed to convey information to the processing unit 11, for example (see FIG. 1); in particular, in the event that each detecting means 5 consists of a photoelectric sensor, the corresponding cable, labelled 90 for the sake of convenience, may be a plain electric cable; in the event, on the other hand, that the detecting member 5 is not capable of converting the electromagnetic radiation into an electrical signal, the corresponding cable 90 may consist of an optical fiber ending, in such case, in an appropriate photoelectric convertor that is connected in turn to the aforesaid processing unit 11.

Figure 6:
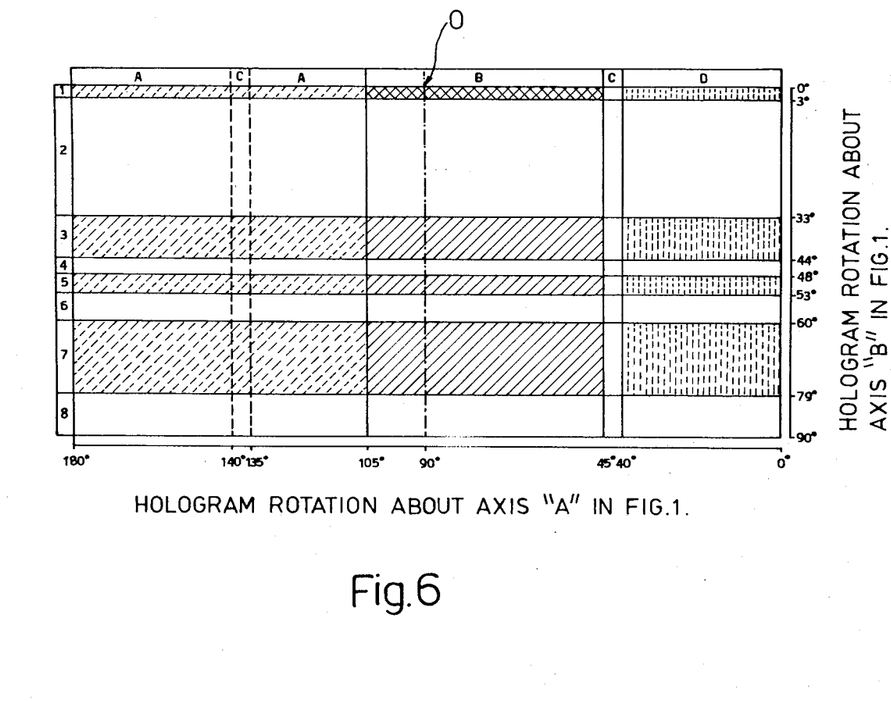
FIG. 6 depicts the progression of a stereoscopic map produced by the device in FIG. 1 according to predetermined conditions of operation and relative position of the various parts.

With particular reference to FIG. 6, the latter illustrates a stereoscopic map obtained by examination of a hologram of the "embossed" type illuminated by a natural source and suitably examined at a predetermined distance. Said map was produced by varying the angle of incidence from the emitting means to the surface of the hologram and specifically by rotating the hologram 2 in FIG. 1 around axes A and B, making the hologram describe an angle of 180° around axis A and an angle of 90° around axis B. In this specific case, the letter O designates the reference position in which the element 4 emitting electromagnetic radiation is so oriented towards the surface of the hologram 2 that the corresponding incident beam of electromagnetic radiation is at a given angle with respect to a given plane of the hologram 2. Let us assume, for example, that the rotation of the hologram with respect to axis A in FIG. 1 is equal to 90°, while the rotation of the hologram with respect to axis B in FIG. 1 is equal to 0°. Along the horizontal axis of FIG. 6 are labelled with the letters A, B, C and D the following angle zones of detection of the hologram by visible reflection in white light ("embossed").

A, a zone with specular reflection of the light source;
B, a zone of definition where the image is formed properly;
C, a blurry zone where there is an "optical break" in the image;
D, a zone of chromatic spotting.

On the vertical axis, the numbers 1 through 8 designate the following zones:

1, a zone with orthoscopic relief and total coloration of the image;
2, a zone with a positive two-dimensional image in black and white;
3, a zone with pseudoscopic relief and total coloration of the image;
4, a transition zone;
5, a zone with a negative two-dimensional image in black and white;
6, a transition zone;
7, a zone with the image reproduced with chromatic flashes;
8, a zone with a negative two-dimensional image in black and white.

It is obvious that maps of the type depicted in FIG. 6 can be obtained in great numbers as a function of the various relative positions that the support means 3, the emitting means 4 and the detecting means may assume.

The maps depicted in FIG. 6 may be suitably translated into a number of electrical signals simply by associating each zone labelled with a letter and a related number (zone B 3, for example) with a corresponding logical number that may be suitably obtained by evaluating, with the aid of an analog comparator, the type of electromagnetic radiation picked up by one of the detecting means 5, then identifying the minimum and maximum values between which the level of the detected signal is situated and finally converting the identified signal into a corresponding logical signal readily processable by the processing unit 11.

Figures 7, 8:
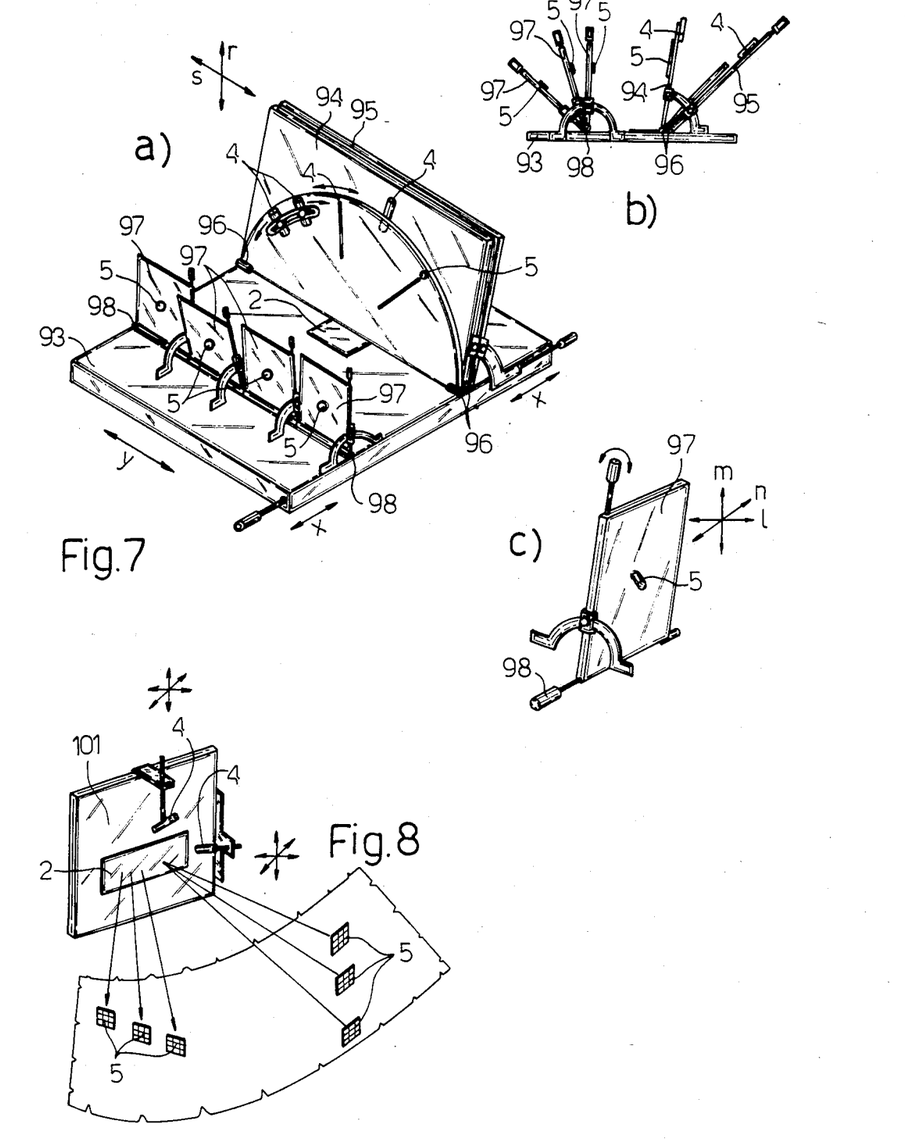
Figure 9:
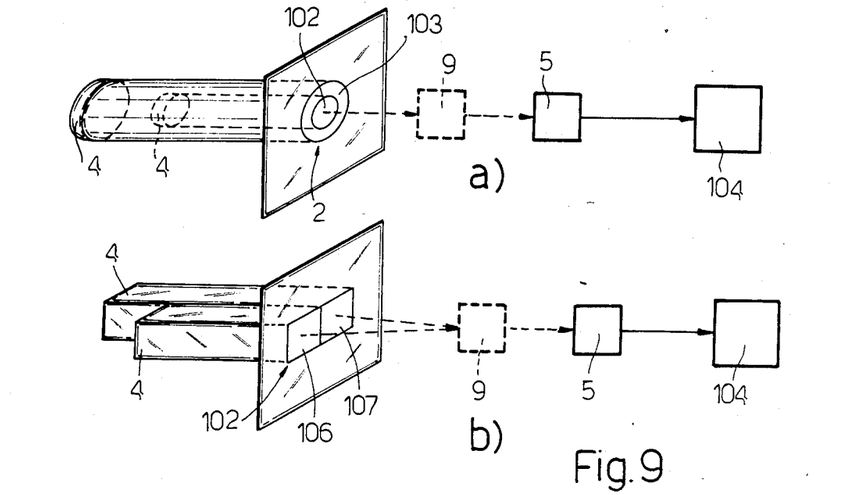

In FIGS. 4 and 5 is shown in each case one of the possible combinations of relative movements of the emitter 4 (in the one specific case) and the receivers 5 (in this specific case arranged on two circular crowns that are concentric around the emitter 4). In FIGS. 7, 8 and 9 are shown other possible alternatives for the relative movements of the emitters 4 and receivers 5 with respect to the hologram 2.

With specific reference to FIG. 7, the emitters 4 and the receivers 5 are supported by corresponding elements capable of sliding in the same plane 93 in which the hologram 2 is positioned. Specifically, the emitters 4 consist of two distinct units supported by two corresponding elements 94, 95 which are capable of turning on pins 96 and can also be moved longitudinally with respect to an axis labelled x. In addition, the emitter 4 supported by element 94 is also designed to move along a circular trajectory at a predetermined distance from the hologram 2; the emitter 4 supported by member 95, on the other hand, can move with respect to two perpendicular directions, labelled r and s respectively, lying in the same plane as that defined by member 95 itself. One of the detectors 5 is movably supported by element 94; the other detectors 5 are instead supported by corresponding lug elements 97 mounted so that they can turn on a common pin 98, which may also be moved within plane 93 with respect to the aforesaid axis x. Within the range of each element 97, the corresponding detector 5 may also be made to move with respect to perpendicular axes or may also be appropriately rotated around a predetermined point of support (see FIG. 7c), with adjustment along axes l, m and n.

In FIG. 8, the emitters 4 consist of two units, each of which is anchored to a supporting plane 101 of the hologram 102. The sensors 5 are conveniently subdivided into two batteries positioned outside of plane 101 and are conveniently adjustable in position. In this specific instance the detectors 5 consist of matrix sensors.

In the embodiments so far described, the emitting means and the detecting means are placed on the same side with respect to the hologram 2, for which reason the portion of electromagnetic radiation that flows towards each detector 5 is essentially what is directed back or transmitted from the surface of the hologram 2. FIG. 9 depicts schematically two embodiments of the device pursuant to the present invention in which the emitting elements 4 are positioned on the opposite side of the hologram 2 from the detecting elements 5 (in this case the hologram is the transmission type). Specifically, in FIG. 9a the hologram has two isocentric sections, one internal and circular, the other external and annular, labelled 102, 103, respectively, on which converge corresponding beams of electromagnetic radiation of predetermined wavelengths, each of which issues from a corresponding emitting element 4. The electromagnetic radiation emerging from the hologram 2 arrives at the detecting element 5 through the above-mentioned intercepting element 9; for purposes of converting the electromagnetic radiation received into a corresponding electrical signal, it is helpful to have it pass from element 5 to an appropriate display element 104, such as a television screen, for example. With reference to FIG. 9b, note that the arrangement of the various parts is analogous in all respects to FIG. 9a, the sole difference being that the hologram 2 consists of two sections side by side, labelled 106, 107 respectively, onto each of which is directed a predetermined beam of electromagnetic radiation generated by a corresponding emitting element 4.

Figure 10:
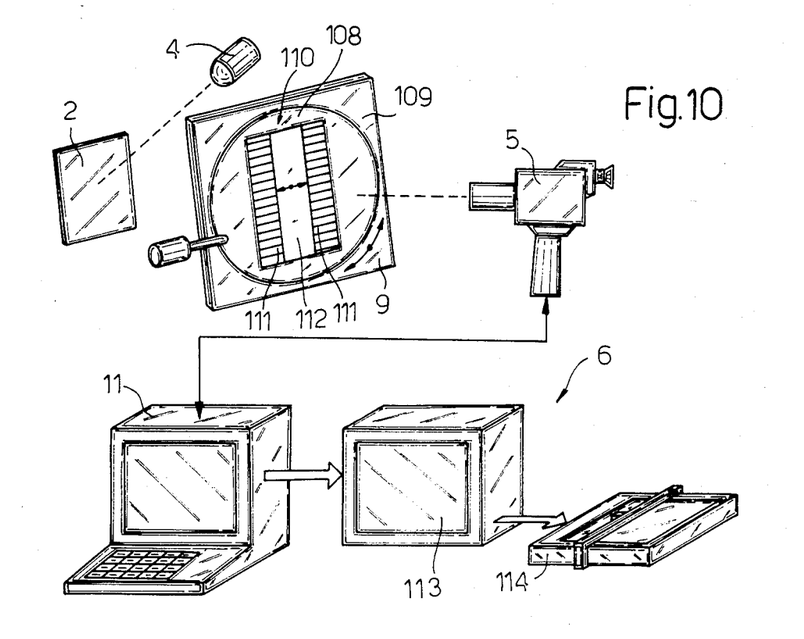

FIG. 10 shows yet another embodiment of the device pursuant to the invention in which the detecting element 5 consists of a television camera, while the intercepting element 9 consists of an appropriate mask essentially comprising a circular table 108 that turns on its axis and is advantageously supported by a plate 109. The table 109 has an essentially square opening 110 in the center that can be intercepted by a pair of flat elements 111 so as to define a slit 112 capable of reducing the field of observation of the detecting element 5. The latter exchanges electrical signals with the processing unit 11, which, on the basis of the signals received from element 5, controls a display screen 113 as well as a writing unit 114. An advantageous feature is that the display screen 113 can display a three-dimensional graph representing the stereoscopic map of the hologram 2.

We will now describe how the device constructed pursuant to the present invention operates, with reference to the two main areas of application, namely the use of a hologram suitably applied to a given document for purposes of combatting forgery and the detection of the stereogoniometric characteristics of the hologram itself. In both cases, scanning and analysis are applied to areas qualitatively different even on the microscopic level of the hologram, which is placed on its own support and appropriately secured on it by suitable means, such as the abovementioned suction plane, for example, depicted in FIG. 2. The detecting elements 5 are capable of reading simultaneously and/or in sequence the respective orientations of the reflection, refraction, diffraction or decomposition of the electromagnetic radiation produced by the holographic frames and the chromatic and achromatic distribution of the hologram with respect to the various axes of analysis. It is obvious that the results obtained depend on the innumerable combinations of the relative positions of the emitting means 4, the detecting means 5 and the hologram 2 (and on their intrinsic characteristics). In fact, for every combination of said positions there corresponds a predetermined electromagnetic radiation reconstituted from the hologram and hence picked up by the detecting means 5.

For purposes of applications in the anti-forgery field, in the memory 13 in FIG. 1 may be stored certain signals picked up by the detecting element 5 corresponding to predetermined relative positions assumed by the hologram 2 during use. Verification of the authenticity of a hologram 2 with respect to a sample hologram is done by placing the hologram 2, using the abovementioned electric motors in FIG. 2, in the same positions in which the signals were taken from the reference hologram, so that the signals stored in the memory 13 can be compared with the signals picked up by the element 5 and checked to see if they are identical. It is obvious that a passport or credit card or a general card permitting access to a reserved area may have more than one hologram or have other systems for verifying authenticity, such as magnetic strips, predetermined integrated circuits, etc.

As we have said, the hologram may be analyzed by means of either reflection or transparent transmission. FIG. 9 specifically illustrates two controls utilizing transparency in which, for example, the two sections constituting the different holograms can be combined together to obtain a single image different from that contained in the said two holograms but capable of being verified by means of suitable sensors and/or the television screen 104, with which the personnel assigned to surveillance can be equipped.

With regard to the detection of the stereogoniometric characteristics of the hologram 2 (see in particular FIG. 10), note that all the positions assumed by the hologram 2 and any perspective variations are picked up by the television camera 5 with its corresponding external linear diaphragm 9, in order to determine the amplitude of the parallax of the linearly-defined image under examination (axes x-y) and, by selective focusing, the apparent extension of the subjects along axis z. The memory of the various images can be compared in order to detect, by means of parallactic (x-y) and/or depth (z) differences, the degree of reconstruction between the preceding image and the one that follows. The parallactic differences and the stereogoniometric map of the hologram 2 can be obtained directly from the writing unit 114 when the analysis is completed.

It should be remembered, finally, that in order to make the conditions of detection and measurement under which the device 1 functions uniform and hence to be able to guarantee that the analyses done by the device are repeatable, one must first check that the signals generated by the lux meter 15, the device 16 for measuring angle of incidence and the spectrometer 17 correspond to the values previously stored in the memory. In particular, it is evident that with respect to the device 16 measuring angle of incidence, the device 1 can work only if the shadow 79 that falls on the matrix 80 coincides with the shadow previously stored in the memory.

After examining the characteristics of the device 1 in its various embodiments are described above, it is clear that it satisfies the objectives previously defined in terms of its use both as a method to combat forgery and in the area of stereogoniometric analysis of the stereoscopic image as specified above. In particular, device 1 provides for detecting the following functions on a respective electronic map obtained from examination of the hologram:

number and type of images;
change in the perspective or geometric models of the image;
colour, through a spectrometer (or spectrophotometer 17), and/or achromatic values;
definition (measurable to the limit of descructive interferometry), for example, using even known types of interferential devices, such as diffraction gratings, holographic filters, etc.

With reference to FIG. 3, it should be noted that the use of two or more sources will result in the presence of an equal number of shadows on the surface of the matrix 80. Storage of the data relating to said shadows may, for example, be accomplished sequentially.

Finally, it is obvious that all the embodiments of the device 1 described above may be modified and varied without going beyond the scope of this invention.

First of all, it is evident that broad changes may be made in the position and number of emitting means 4 and detecting means 5. For example, there could be a pair of support elements of the type described in FIGS. 4 and 5, both oriented towards a single hologram and each having an emitter of electromagnetic radiation at one or various predetermined wave lengths. Auxiliary radiation emitters may also be used to advantage for revealing special codes, even cryptographic codes, inside or outside the hologram, or on the respective support element. The group constituted by sensors 15, 16 and 17 could be suitably mounted on an appropriate movable support, a suitable card, for example, that could be positioned on the opening 55 in FIG. 2 before positioning the said hologram to be checked. It is also evident that in addition to the reflection and transparency systems as described above for analyzing the hologram, one could also set up a composite system using emitting means placed on opposite sides of the hologram in order to obtain information both by reflection and by transparency. The hologram in question, moreover, could be mounted, not on an ordinary support selected from among those currently known to the art, but on a television screen, which in such case would be positioned on the aperture 55 of FIG. 2 and moved in a manner completely analogous to that described above. The structure of the device as depicted in FIG. 7, with regard to the lug elements 94, 95, means that with circumferential exploration and advancement along axis x a scan can be performed that will supply data on the surface texture characteristics of the holographic support, to be compared with those of the hologram transferred onto it. It is evident that for this application, it might be desirable to use a coherent light source. Each intercepting element 9 could also comprise a semireflecting mirror or a signal duplicator so that the signal could be examined simultaneously by a number of sensors (for example, one electronic, and another different type of decoding sensor, even cryptographic, for identifying alphanumerical and non-alphanumerical data, e.g. by means of a spectrophotometer, interferential devices, processing Fourier transforms, and/or mathematical operations for temporal reversal of undulatory motion).

As regards processing unit 6, this could be employed as a peripheral unit, conveniently supplied and programmed for enabling real-time modification, e.g. as requested by a central processing unit, of the relative movements of the hologram or emitting and detecting means. Along given portions of the path of the said electromagnetic radiation between emitting means 4 and detecting means 5, appropriate means (e.g. optical fibres) may be provided for conveying the said electromagnetic radiation. Likewise, there may be installed an autocollimating device for ensuring correct relative positioning of the various parts involved.

Finally, detecting means 5 may consist of a screen designated to receive the image/s reconstructed, in use, from hologram 2, in which case, processing means 6 may be dispensed with.

I claim:

1. Device for verifying the authenticity and quality control of a hologram with respect to a sample hologram comprising:
   means of support for said hologram, said support means comprising a framework;
   means for emitting electromagnetic radiation incident upon said hologram;
   said support means and said emitting means having at least three degrees of freedom with respect to each other;
   analog means for detecting the electromagnetic radiation corresponding to images reconstructed from said hologram during use;
   means for processing signals emitted by said detecting means in at least two predetermined relative positions assumed during use by said support means, radiation emitting means, and detecting means; said processing means comprising memory means in which reference signals, taken from said sample hologram in the same positions in which said reference signals are received from said hologram, are stored;
   a processing unit which compares said stored signals with said received signals to make a determination if said stored signals and said received signals are identical; and
   an output unit which is connected to said processing unit to display results of said determination made by said processing unit.

2. Device pursuant to claim 1, characterized in that the said means of support comprise means of securing (56) said hologram (2).

3. Device pursuant to claim 2, characterized in that the said securing means are pneumatic in nature.

4. Device pursuant to claim 1, characterized racterized in that the said means of support comprise means for guiding and positioning (57) said hologram (2).

5. Device pursuant to claim 1, characterized by comprising means of moving said framework with respect to the said degrees of freedom.

6. Device pursuant to claim 5, characterized in that said means of movement comprise a number of electric motors (21, 28, 35, 36, 37, 49), each of which is designed to move a portion of the said framework.

7. Device pursuant to claim 5, characterized in that it comprises means of detecting the relative position assumed by the said parts of the said framework.

8. Device pursuant to claim 7, characterized in that the said detecting means comprise essentially a number of optical forks, each acting in conjunction with a corresponding code disc rotated by said motor; the said detecting means are connected with the said processing means (6).

9. Device pursuant to claim 1, characterized by comprising means of support and relative movement of the said means (4) of emitting electromagnetic radiation with respect to one or more degrees of freedom.

10. Device pursuant to claim 1, characterized by comprising means for relative movement of the said detecting means (5) with respect to one or more degrees of freedom.

11. Device pursuant to claim 1, characterized by comprising means (8, 9) of intercepting the said electromagnetic radiation that are interposed along the optical pathway that joins the said means (4) for emitting radiation (4) and the said detecting means (5), either by reflection or by transmission (transparency).

12. Device pursuant to claim 11, characterized in that the said intercepting means (8, 9) comprise one or more filters and/or lenses and/or masks and/or diaphragms.

13. Device pursuant to claim 1, characterized in that the means (4) of emitting electromagnetic radiation comprise at least two emitting elements designed to generate electromagnetic radiation with different wave lengths.

14. Device pursuant to claim 1, characterized in that the said detecting means (5) comprise at least one television camera.

15. Device pursuant to claim 1, characterized by comprising means (15, 16, 17) for sensing characteristics associated with the said electromagnetic radiation incident on the said hologram (2).

16. Device pursuant to claim 15, characterized in that the said sensing means comprise at least one lux meter (15).

17. Device pursuant to claim 15, characterized in that the said sensing means comprise at least one spectrometer (17).

18. Device pursuant to claim 15, characterized in that the said sensing means comprise a device (16) for measuring the angle of incidence of the said electromagnetic radiation with respect to the said hologram.

19. Device pursuant to claim 15, characterized in that the said sensing means (15, 16, 17) are supported by a single structure designed to be positioned during use in a predetermined reference position.

20. Device pursuant to claim 1, characterized in that it comprises means for conveying the said electromagnetic radiation, said means being installed along at least one portion of the path of the said electromagnetic radiation between the said emitting means (4) and the said detecting means (5).

21. Device pursuant to claim 1, characterized in that it comprises means for adjusting the position of the said means (4) for emitting the said electromagnetic radiation.

22. Device pursuant to claim 1, characterized in that it comprises auxiliary electromagnetic radiation emitting means, which may be employed to advantage for revealing given codes, even cryptographic codes, inside or outside the said hologram (2) or on a hologram support.

* * * * *